US012202236B2

(12) United States Patent
Morishita (10) Patent No.: US 12,202,236 B2
(45) Date of Patent: Jan. 21, 2025

(54) CAPACITIVE SENSOR (71) Applicant: NGK INSULATORS, LTD., Nagoya (JP)

(72) Inventor: Akifumi Morishita, Komaki (JP)

(73) Assignee: NGK INSULATORS, LTD., Nagoya (JP)

( * ) Notice: Subject to any disclaimer, the term of this patent is extended or adjusted under 35 U.S.C. 154(b) by 134 days.

(21) Appl. No.: 17/994,228

(22) Filed: Nov. 25, 2022

(65) Prior Publication Data

US 2023/0091344 A1 Mar. 23, 2023

Related U.S. Application Data (63) Continuation of application No. PCT/JP2021/019964, filed on May 26, 2021.

(30) Foreign Application Priority Data

May 29, 2020 (JP) ................. 2020-094469

(51) Int. Cl.
G01N 27/04 (2006.01)
B32B 3/08 (2006.01)
G01F 23/263 (2022.01)
G01N 13/04 (2006.01)
G01N 19/00 (2006.01)
(Continued)

(52) U.S. Cl.
CPC .............. *B32B 3/08* (2013.01); *G01F 23/263* (2013.01); *G01N 27/226* (2013.01); *B32B 18/00* (2013.01); *B32B 2255/20* (2013.01); *B32B 2307/206* (2013.01); *B32B 2457/16* (2013.01)

(58) Field of Classification Search
CPC ........ G01N 27/12; G01N 27/22; G01N 19/00; G01N 19/10; G01N 27/04; G01N 13/04; G01R 1/04; G01R 1/067; G01R 1/073
See application file for complete search history.

(56) References Cited

U.S. PATENT DOCUMENTS 7,692,432 B2    4/2010 Yoshida et al.
8,573,052 B2 *  11/2013 Hong ................. G01N 27/223
                                                  73/335.04
(Continued)

FOREIGN PATENT DOCUMENTS

JP    62-182642 A    8/1987
JP    62-184342 A    8/1987
(Continued)

OTHER PUBLICATIONS

International Search Report of PCT/JP2021/019964 dated Jul. 13, 2021.
(Continued)

*Primary Examiner* — Neel D Shah
(74) *Attorney, Agent, or Firm* — MATTINGLY & MALUR, PC (57) ABSTRACT A first detection electrode is provided on an insulating layer. A second detection electrode is provided away from the first detection electrode on the insulating layer, and forms a capacitance together with the first detection electrode. The protection layer covers the first detection electrode and the second detection electrode, has a thickness d satisfying $1\ \mu m \leq d \leq 10\ \mu m$, and is made of zirconia or alumina. The protection layer is a sintered body.

8 Claims, 12 Drawing Sheets (51) Int. Cl.
*G01N 19/10* (2006.01)
*G01N 27/12* (2006.01)
*G01N 27/22* (2006.01)
*G01R 1/04* (2006.01)
*G01R 1/067* (2006.01)
*G01R 1/073* (2006.01)
*B32B 18/00* (2006.01)

(56) References Cited

U.S. PATENT DOCUMENTS

| | | | | |
|---|---|---|---|---|
| 2001/0048312 A1* | 12/2001 | Nakamura | ............ | G01F 23/261 |
| | | | | 324/658 |
| 2007/0125663 A1 | 6/2007 | Sasanuma et al. | | |
| 2007/0131020 A1* | 6/2007 | Itakura | ................ | G01N 27/223 |
| | | | | 73/29.02 |
| 2008/0100309 A1 | 5/2008 | Yoshida et al. | | |
| 2009/0050990 A1* | 2/2009 | Aono | ....................... | G01P 1/023 |
| | | | | 438/51 |
| 2010/0307238 A1* | 12/2010 | Van Popta | ............ | G01N 27/225 |
| | | | | 73/335.04 |

FOREIGN PATENT DOCUMENTS

| | | |
|---|---|---|
| JP | 62-291554 A | 12/1987 |
| JP | 3029482 B2 | 4/2000 |
| JP | 2006-337173 A | 12/2006 |
| JP | 2007-183245 A | 7/2007 |
| JP | 2008-111669 A | 5/2008 |
| JP | 2009-210503 A | 9/2009 |
| JP | 4623668 B2 | 2/2011 |
| JP | 4821560 B2 | 11/2011 |

OTHER PUBLICATIONS

International Preliminary Report on Patentability received in corresponding International Application No. PCT/JP2021/019964 dated Dec. 8, 2022.

Japanese Office Action received in corresponding Japanese Application No. 2022-526610 dated Sep. 5, 2023.

* cited by examiner

CAPACITIVE SENSOR

CROSS-REFERENCE TO RELATED APPLICATION

This application is a continuation application of PCT/JP2021/019964, filed on May 26, 2021, which claims the benefit of priority of Japanese Patent Application No. 2020-094469, filed on May 29, 2020, the entire contents of which are incorporated herein by reference.

BACKGROUND OF THE INVENTION

Field of the Invention

The present invention relates to a capacitive sensor.

Description of the Background Art

A liquid level sensor is disclosed according to Japanese Patent Application Laid-Open No. 2009-210503. The liquid level sensor includes a base body made of polyimide and a plurality of electrodes made of Ag. A liquid level is calculated based on a magnitude of a capacitance between electrodes.

Disclosed according to Japanese Patent Application Laid-Open No. 2008-111669 is a liquid property sensor for detecting a property of a liquid having a different relative dielectric constant depending on the property. The liquid property sensor includes a semiconductor substrate, first and second electrodes disposed on the same plane on the semiconductor substrate at a predetermined interval, and a protection film formed on the semiconductor substrate to cover a surface of the semiconductor substrate where the first and second electrodes are formed and having resistance to a liquid. The protection film is disposed to be exposed to a liquid, and a capacitance value corresponding to a relative dielectric constant of the liquid is detected by the first and second electrodes. According to Document described above, the protection film is preferably formed to have a film thickness of 10 μm or less by reason that when the film thickness of the protection film is increased, electrical field acting on an area between the first and second electrodes hardly reaches the liquid near a surface of the protection film, and detection sensitivity decreases. According to Document described above, the protection film is preferably formed by a silicon oxide film or a silicon nitride film by reason that such a film has favorable resistance to a liquid to be detected in the liquid property sensor described above such as gasoline, alcohol, or oil and is easily formed using a normal semiconductor manufacturing technique.

According to the technique of Japanese Patent Application Laid-Open No. 2009-210503, a configuration of protecting the electrodes from a liquid whose liquid level is detected is not disclosed. It is difficult to ensure corrosion resistance and chemical resistance without such a configuration. Specifically, there is concern that the electrodes are damaged by peeling, for example, when a cleaning treatment is performed on the sensor. The electrodes can be a generation source of metal contamination in the liquid; thus the sensor is not appropriate for use application avoiding the metal contamination such as a semiconductor process use and medical use, for example, in some cases.

According to the technique of Japanese Patent Application Laid-Open No. 2008-111669, a silicon oxide film or a silicon nitride film is used as a configuration for protecting an electrode. These materials have a relatively low relative dielectric constant. Accordingly, a magnitude of a detected capacitance tends to be small. Thus, sensor sensitivity tends to be low.

SUMMARY

The present invention therefore has been made to solve problems as described above, and it is an object to provide a capacitive sensor achieving detection with a high degree of sensitivity while ensuring corrosion resistance and chemical resistance.

A capacitive sensor according to one aspect is a capacitive sensor using a change of a capacitance. The capacitive sensor includes an insulating layer, a first detection electrode, a second detection electrode, and a protection layer. The first detection electrode is provided on the insulating layer. The second detection electrode is provided away from the first detection electrode on the insulating layer, and forms the capacitance together with the first detection electrode. The protection layer covers the first detection electrode and the second detection electrode, and has a thickness d satisfying 1 μm≤d≤10 μm, and is made of zirconia or alumina.

The protection layer is preferably made of zirconia.

The protection layer has a relative dielectric constant ε, and ε/d≥1 is preferably satisfied.

A minimum interval between the first detection electrode and the second detection electrode is preferably 100 μm or less. The minimum interval is a dimension on at least one straight line, and a dimension of each of the first detection electrode and the second detection electrode is preferably 100 μm or less on the at least one straight line.

The capacitive sensor may further include a heater to heat the protection layer.

The capacitive sensor may be a liquid detection sensor.

The capacitive sensor may be a liquid level sensor.

The capacitive sensor may be a dew condensation sensor.

According to the capacitive sensor, firstly, the protection layer covering the first detection electrode and the second detection electrode is made of zirconia or alumina. Accordingly, corrosion resistance and chemical resistance of the capacitive sensor are increased. Secondly, the thickness d of the protection layer satisfies 1 μm≤d≤10 μm. Accordingly, significant reduction in sensitivity of the capacitive sensor caused by the provision of the protection layer is prevented while ensuring the corrosion resistance and the chemical resistance described above. As described above, detection can be performed with a high degree of sensitivity while ensuring the corrosion resistance and the chemical resistance.

When the protection layer is made of zirconia, the protection layer has a relatively high relative dielectric constant. Accordingly, reduction in sensitivity of the capacitive sensor caused by the provision of the protection layer is prevented more sufficiently.

When ε/d≥1 is satisfied, a capacitance per unit area formed via the protection layer is increased. Accordingly, sensitivity of the capacitive sensor can be sufficiently ensured.

When the capacitive sensor includes a heater for heating the protection layer, a liquid adhering to the protection layer can be removed by heating. Accordingly, sensitivity for newly detecting the liquid can be rapidly ensured.

According to the liquid detection sensor, a liquid can be detected with a high degree of sensitivity while ensuring corrosion resistance and chemical resistance.

According to the liquid level sensor, a liquid level can be detected with a high degree of sensitivity while ensuring corrosion resistance and chemical resistance.

According to the dew condensation sensor, dew condensation can be detected with a high degree of sensitivity while ensuring corrosion resistance and chemical resistance.

These and other objects, features, aspects and advantages of the present invention will become more apparent from the following detailed description when taken in conjunction with the accompanying drawings.

BRIEF DESCRIPTION OF THE DRAWINGS

FIG. 2.

FIG. 2.

FIG. 2.

DESCRIPTION OF THE PREFERRED EMBODIMENTS

Embodiments of the present invention are described based on the drawings hereinafter.

Embodiment 1

(Configuration)

Figure 1:
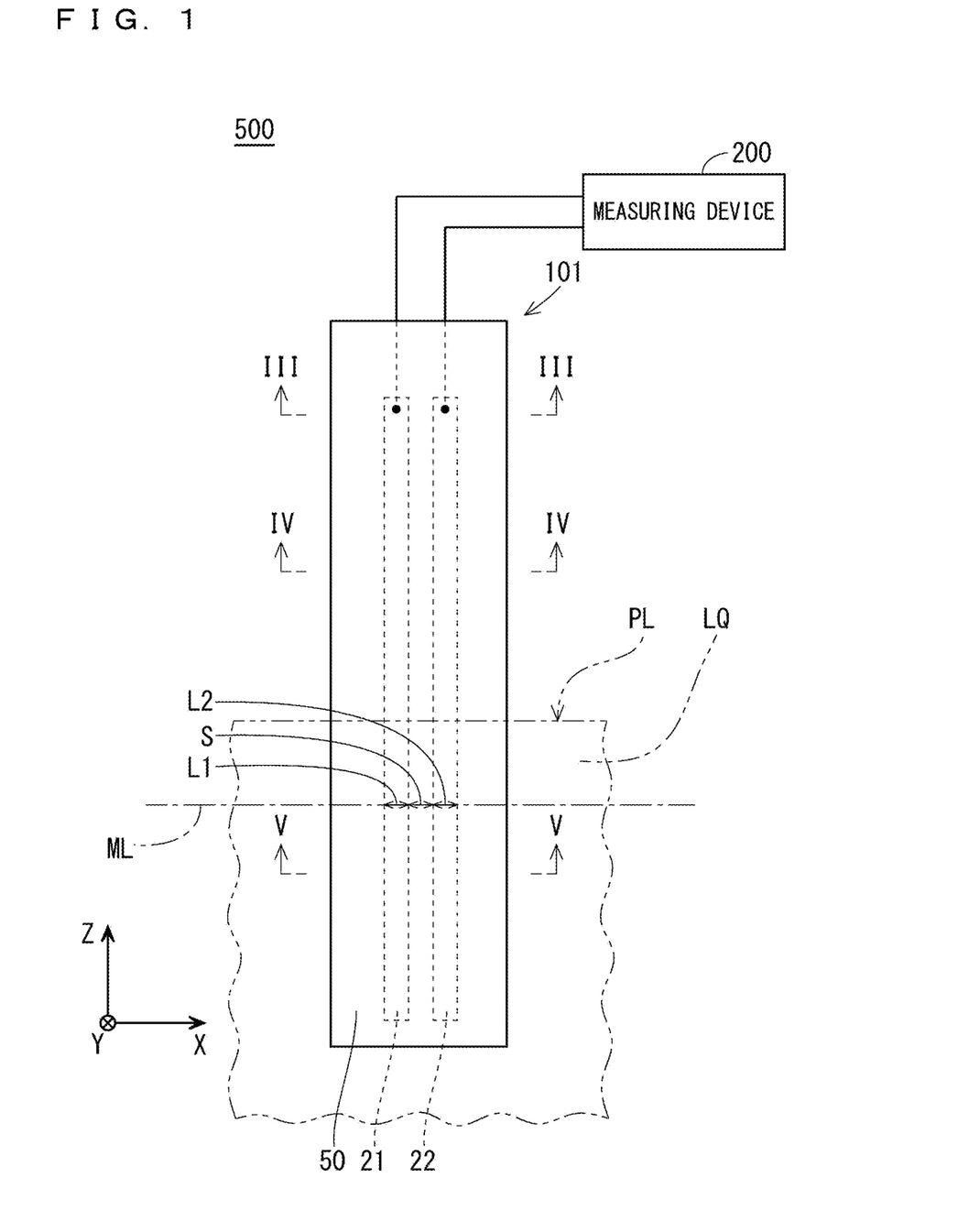
FIG. 1 is a front view schematically illustrating a configuration of a detection system including a capacitive sensor according to embodiment 1.
Figure 2:
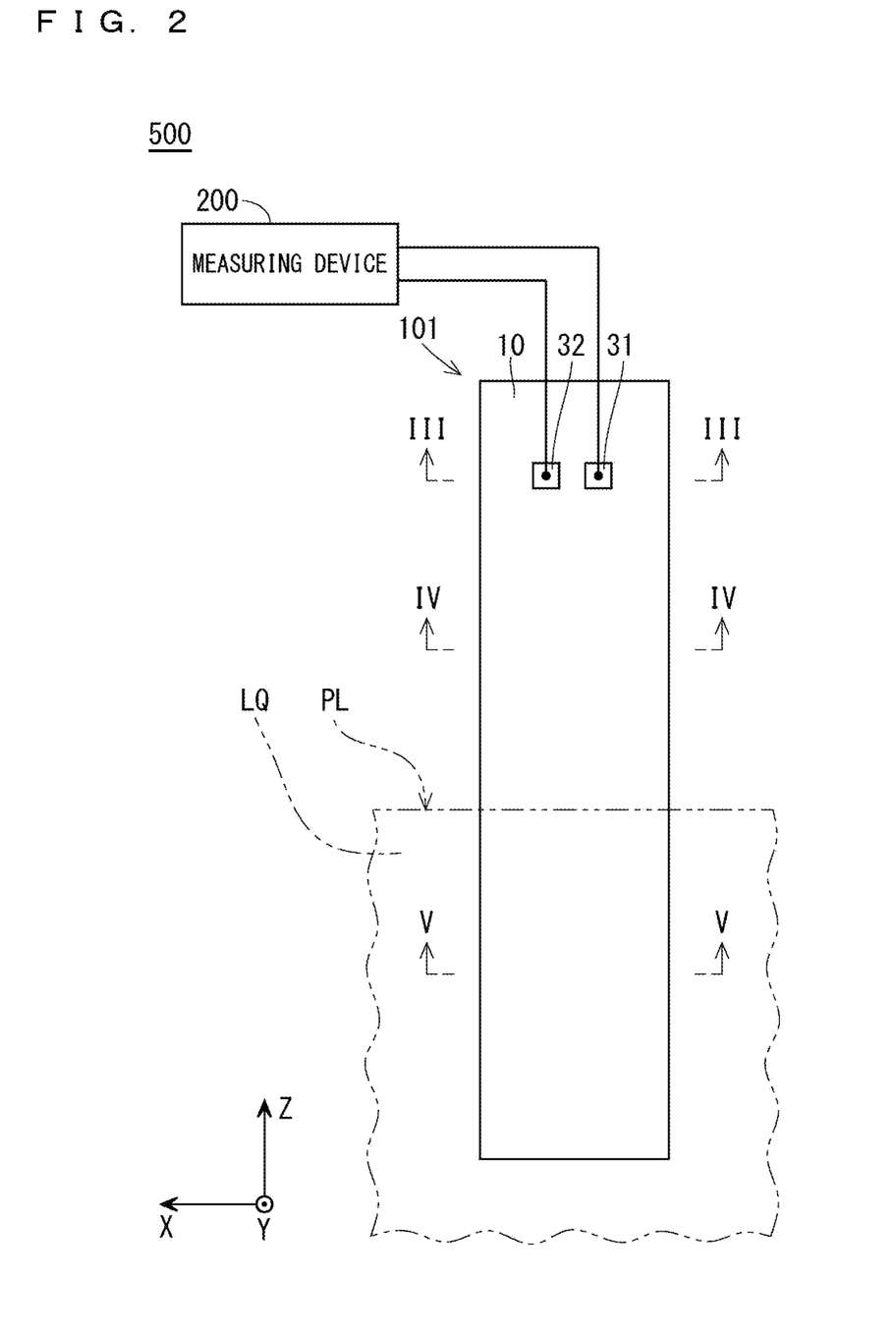
FIG. 2 is a schematic back view of FIG. 1.
Figure 3:
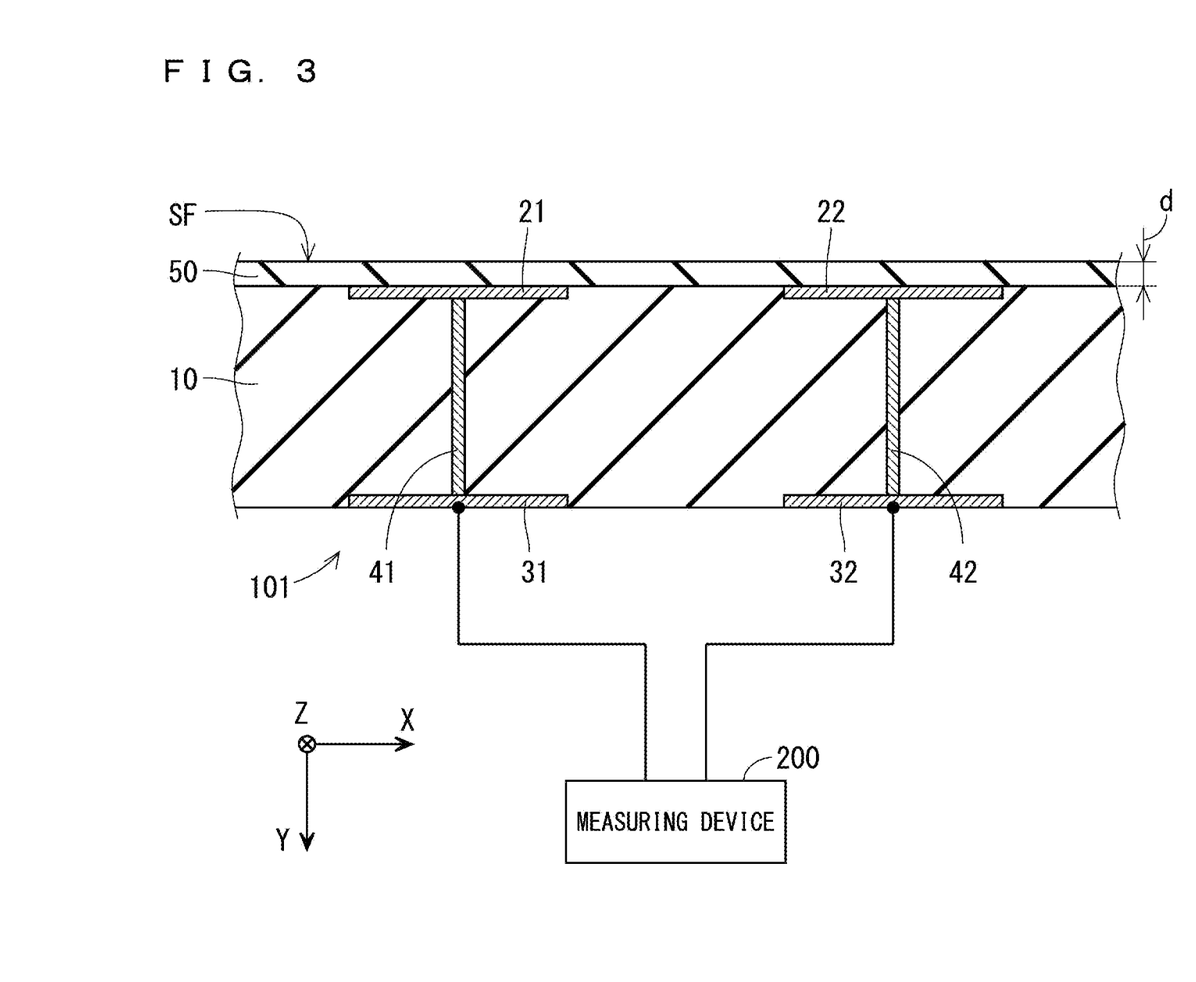
FIG. 3 is a schematic partial cross-sectional view along a line III-III in FIG. 1.
Figure 4:
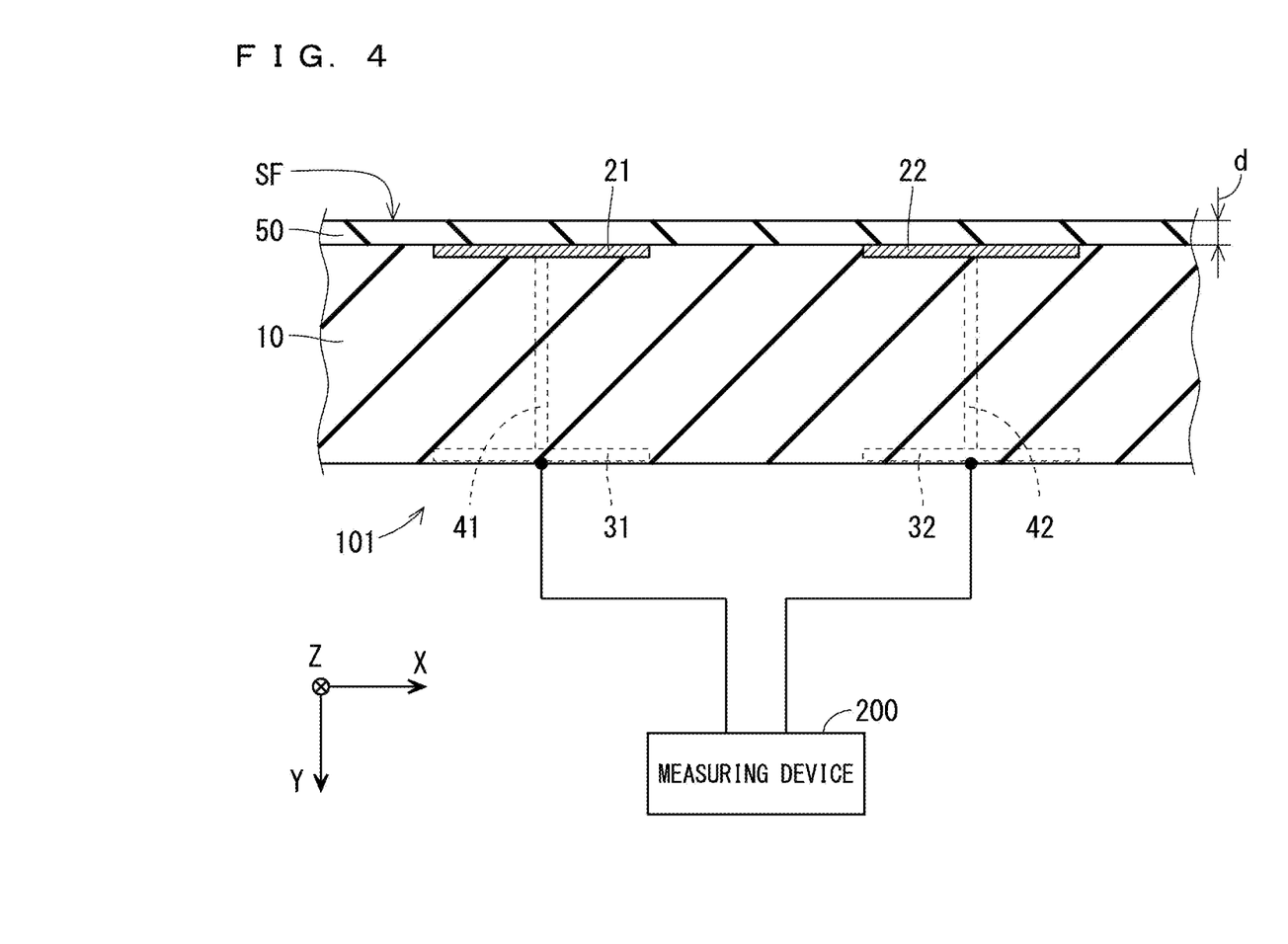
FIG. 4 is a schematic partial cross-sectional view along a line IV-IV in FIG. 1.
Figure 5:
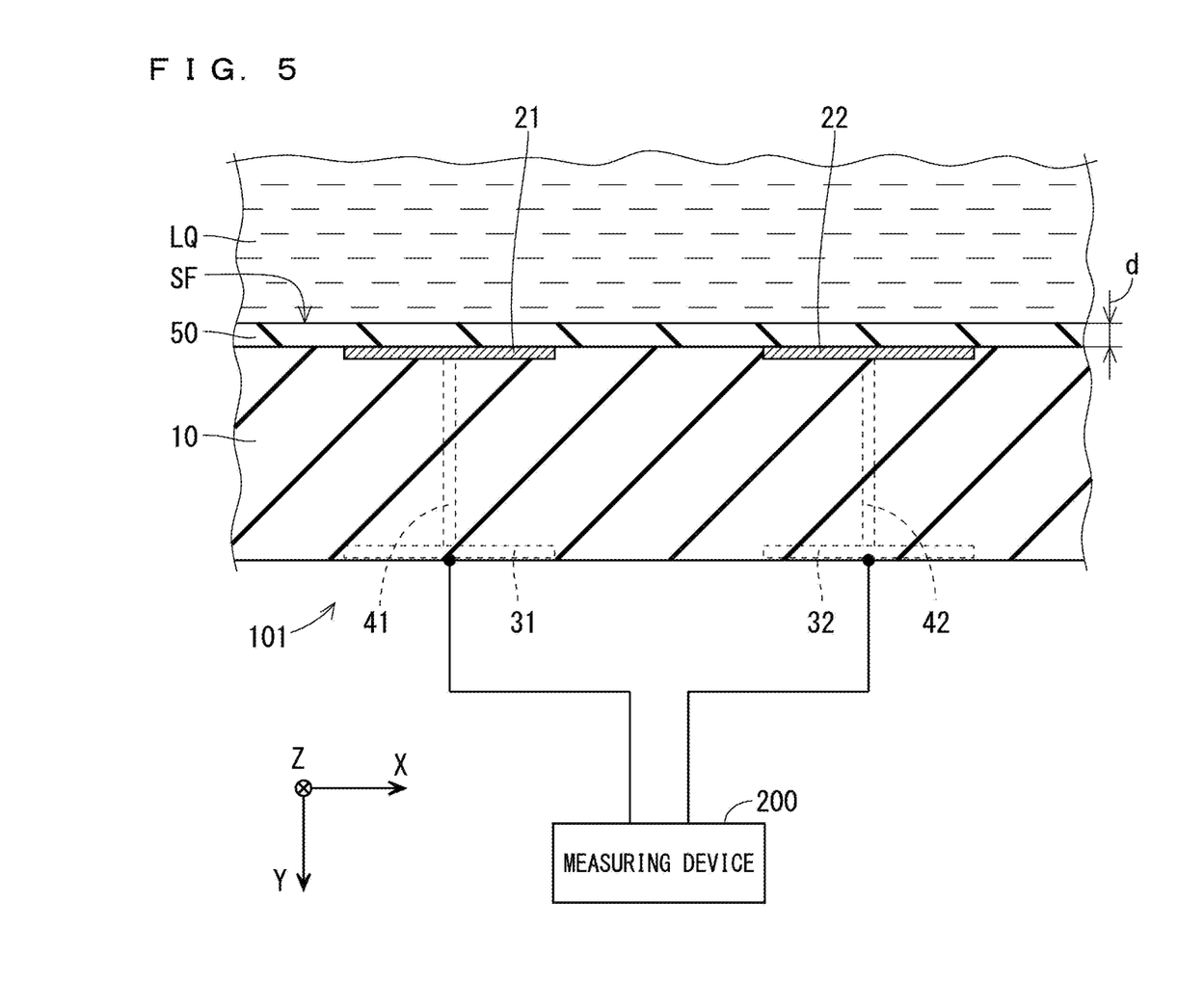
FIG. 5 is a schematic partial cross-sectional view along a line V-V in FIG. 1.

FIG. 1 and FIG. 2 are a front view and a back view, respectively, each schematically illustrating a configuration of a detection system 500 including a liquid level sensor 101 (a capacitive sensor as a liquid detection sensor) in the present embodiment. FIG. 3 is a schematic partial cross-sectional view along a line III-III in FIG. 1 and FIG. 2. FIG. 4 is a schematic partial cross-sectional view along a line IV-IV in FIG. 1 and FIG. 2. FIG. 5 is a schematic partial cross-sectional view along a line V-V in FIG. 1 and FIG. 2. Each of FIG. 1 and FIG. 2 illustrates an example of a liquid level PL of a liquid LQ to be detected by a liquid level sensor 101 by virtual lines. FIG. 5 illustrates the liquid LQ. An XYZ rectangular coordinate system is illustrated to view the drawings easily. The direction Z corresponds to a vertical upper side in the present embodiment. An origin point in the Z direction corresponds to a zero position of the liquid level PL.

The detection system 500 includes a liquid level sensor 101 and a measuring device 200. The liquid level sensor 101 is a capacitive sensor performing detection using a change of a capacitance. The liquid level sensor 101 includes an insulating layer 10, a first detection electrode 21, a second detection electrode 22, and a protection layer 50. The liquid level sensor 101 may further include a first pad electrode 31, a second pad electrode 32, a first via electrode 41, and a second via electrode 42.

The insulating layer 10 is preferably made up of a ceramic insulating material, and is more preferably made up of the same material as the protection layer 50. A thickness of the insulating layer 10 is approximately 1 mm, for example.

The first detection electrode 21 is provided on one surface of the insulating layer 10 as illustrated in FIG. 3 to FIG. 5. The second detection electrode 22 is provided away from the first detection electrode 21 on the insulating layer 10. The second detection electrode 22 forms a capacitance together with the first detection electrode 21.

A minimum interval between the first detection electrode 21 and the second detection electrode 22 is defined as an electrode interval S (FIG. 1). The electrode interval S is preferably equal to or larger than 20 µm and equal to or smaller than 100 µm. The minimum interval S is a dimension on at least one straight line ML. A dimension of the first detection electrode 21 and a dimension of the second detection electrode 22 on the at least one straight line ML are defined as an electrode width L1 and an electrode width L2, respectively. Each of the electrode width L1 and the electrode width L2 is preferably equal to or larger than 20 µm and equal to or smaller than 100 µm. The electrode width L1 and the electrode width L2 are collectively referred to as an electrode width L in some cases hereinafter. The first detection electrode 21 and the second detection electrode 22 may constitute a line-and-space pattern as illustrated in FIG. 1. The first detection electrode 21 and the second detection electrode 22 are preferably made of metal hardly oxidized and having a high melting point, and is made of platinum, tungsten, or cobalt, for example. A thickness of each of the first detection electrode 21 and the second detection electrode 22 is approximately 5 µm, for example.

The protection layer 50 covers the first detection electrode 21 and the second detection electrode 22. The protection layer 50 includes a surface SF and a surface on a side opposite to the surface SF to face the first detection electrode 21 and the second detection electrode 22. The protection layer 50 has a thickness d satisfying $1\ \mu m \leq d \leq 10\ \mu m$, and preferably has a thickness d satisfying $1\ \mu m \leq d \leq 5\ \mu m$. The protection layer 50 is made of zirconia or alumina, and is preferably made of zirconia. The protection layer 50 has a relative dielectric constant ε, and $\varepsilon/d \geq 10$ is preferably satisfied. For example, ε of approximately 30 can be obtained by using zirconia, and ε of approximately 10 can be obtained by using alumina. $\varepsilon/d \geq 1$ is preferably satisfied.

The first pad electrode 31 is provided on an opposite surface of the insulating layer 10 from the one surface described above. The second pad electrode 32 is provided on the opposite surface of the insulating layer 10 from the one surface described above, away from the first pad electrode 31. The first via electrode 41 passes through the insulating layer 10, and includes one end connected to the first detection electrode 21 and the other end connected to the first pad electrode 31. The second via electrode 42 passes through the insulating layer 10, and includes one end connected to the second detection electrode 22 and the other end connected to the second pad electrode 32.

The measuring device 200 has a function of measuring a capacitance. The measuring device 200 is electrically connected to the first pad electrode 31 and the second pad electrode 32. Accordingly, the measuring device 200 can measure the capacitance formed by the first detection electrode 21 and the second detection electrode 22.

A plurality of processes described hereinafter are performed in a liquid detection method using the liquid level sensor 101. Performed firstly is a process of detecting the capacitance of the liquid level sensor 101. Performed next is a process of detecting the liquid LQ, specifically a process of detecting the liquid level PL of the liquid LQ based on the capacitance detected by the process of detecting the capacitance.

Figure 6:
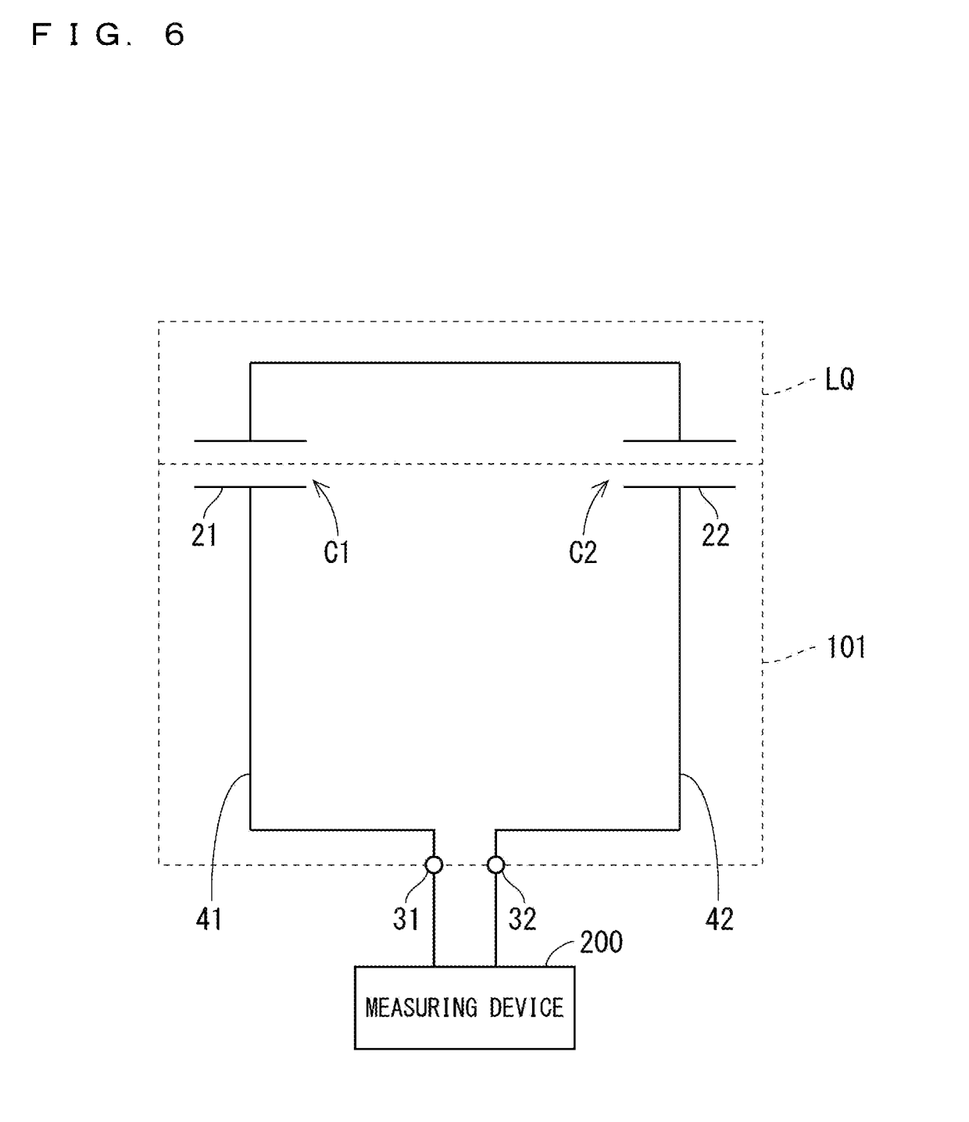
FIG. 6 is a circuit diagram illustrating an approximative equivalent circuit corresponding to FIG. 5.
Figure 7:
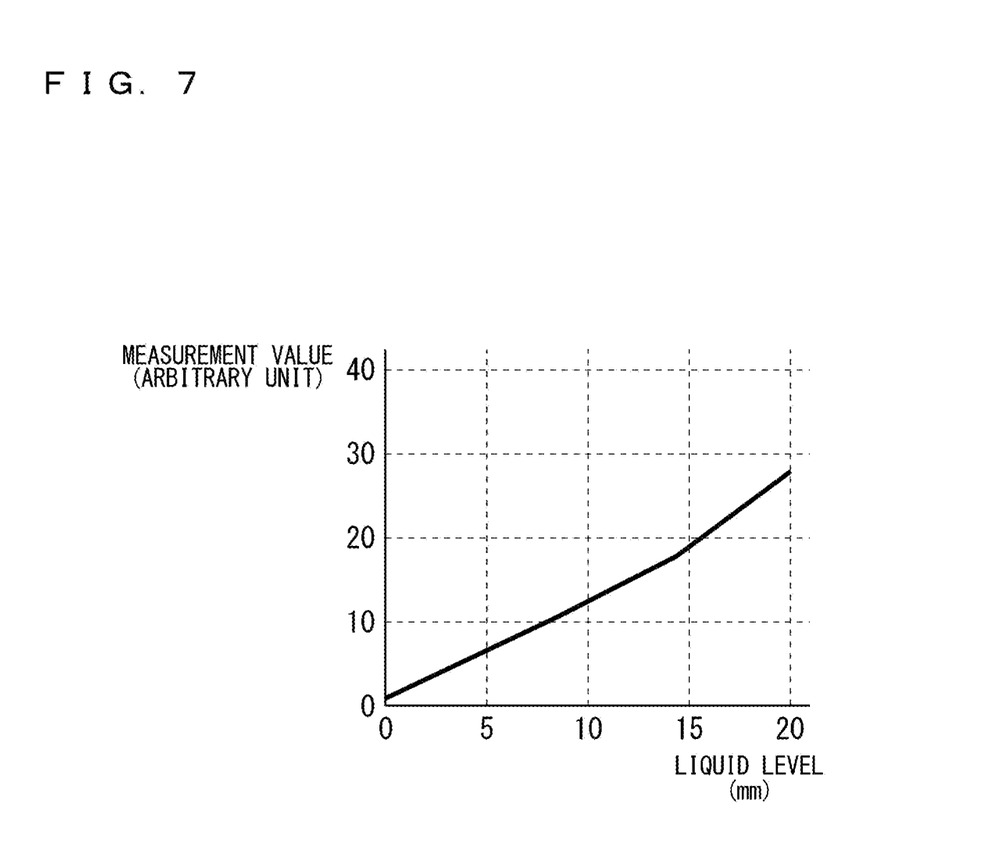
FIG. 7 is a graph chart illustrating an example of a relationship between a liquid level and a measurement value of a capacitance of the capacitive sensor.

FIG. 6 is a circuit diagram illustrating an approximative equivalent circuit corresponding to FIG. 5. FIG. 7 is a graph chart illustrating an example of a relationship between the liquid level PL and a measurement value of the capacitance of the liquid level sensor 101. A result in FIG. 7 indicates a case where each of the first detection electrode 21 and the second detection electrode 22 has a width of 3 mm, a thickness of 0.5 mm, and a length 30 mm in X direction, Y direction, and Z direction, respectively, and the liquid LQ has an electrical conductivity of 1 mS/m.

A configuration that the liquid LQ and the first detection electrode 21 face each other via the protection layer 50 forms a capacitance C1 with reference to FIG. 5 and FIG. 6. In the similar manner, a configuration that the liquid LQ and the second detection electrode 22 face each other via the protection layer 50 forms a capacitance C2. A capacitance C measured by the measuring device approximately corresponds to the capacitance made up of a series connection of the capacitance C1 and the capacitance C2, thus is calculated by $$C = C1 \times C2/(C1+C2).$$

As illustrated in FIG. 1, when a configuration of the second detection electrode 22 is similar to that of the first detection electrode 21, C2=C1 is satisfied, and in this case, the above expression is rewritten as $$C = C1/2.$$

A measurement value of the capacitance C is substantially proportional to the liquid level PL as illustrated in FIG. 6. Thus, by previously grasping the relationship between the liquid level PL and the measurement value of the capacitance C illustrated in FIG. 7, the liquid level can be detected using the measurement value of the liquid level sensor 101.

Herein, the capacitance C is approximated by a capacitance formed via the protection layer 50, thus is substantially proportional to a product of a relative dielectric constant and a thickness of the protection layer 50, that is $\varepsilon/d$. A magnitude of the capacitance C is preferably large to some extent to detect a rate of change of the capacitance C with a high degree of accuracy. Thus, $\varepsilon/d$ is preferably large to some extent, and specifically, $\varepsilon/d \geq 1$ is preferably satisfied.

(Manufacturing Method)

Figure 8:
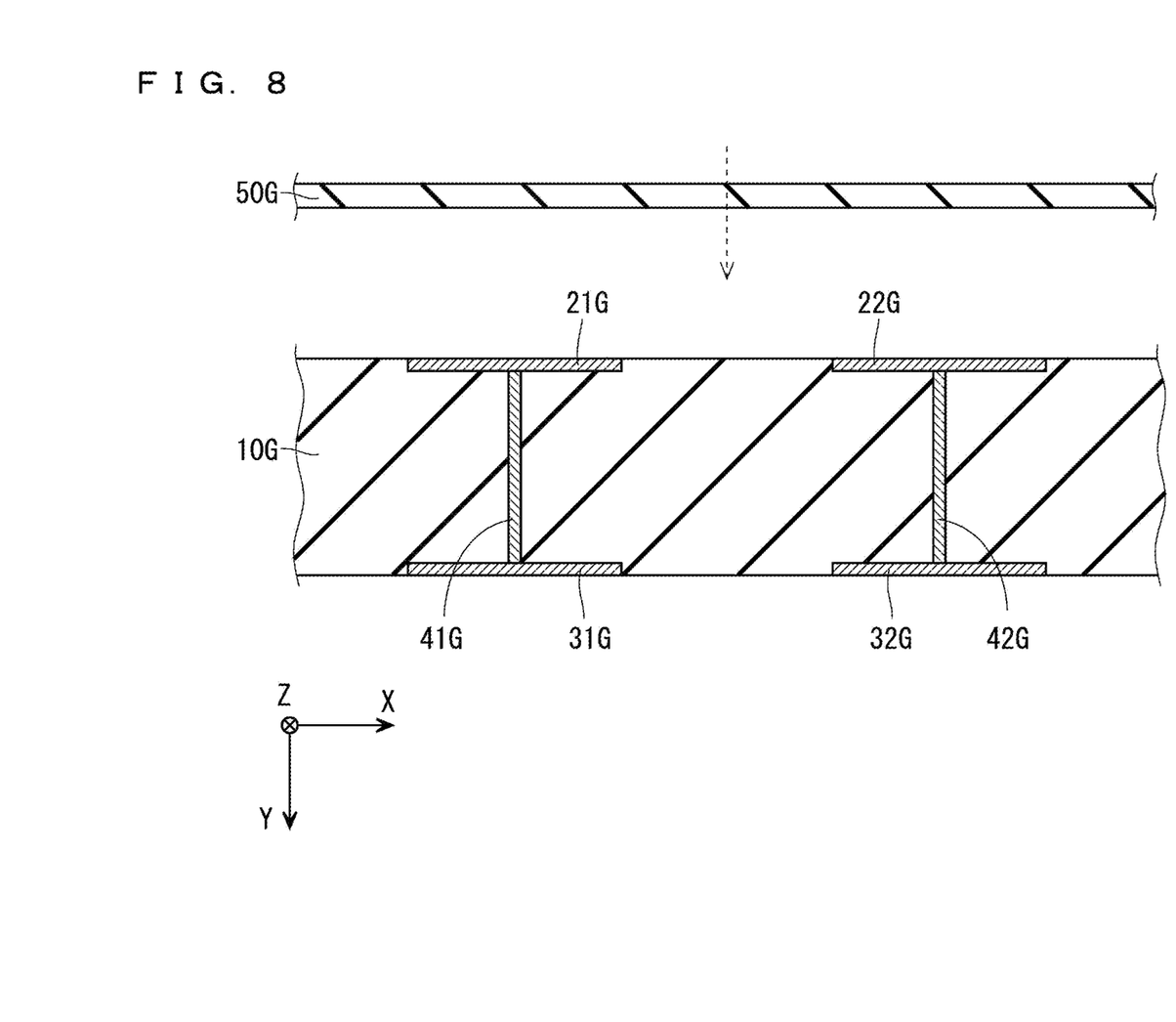
FIG. 8 is a partial cross-sectional view schematically illustrating one process in a method of manufacturing a capacitive sensor according to embodiment 1.

FIG. 8 is a partial cross-sectional view schematically illustrating one process in a method of manufacturing the liquid level sensor 101 according to the present embodiment.

Prepared with reference to FIG. 3 and FIG. 8 is a laminated body including a green sheet 10G which is to be the insulating layer 10, a paste layer 21G which is to be the first detection electrode 21, a paste layer 22G which is to be the second detection electrode 22, a paste layer 31G which is to be the first pad electrode 31, a paste layer 32G which is to be the second pad electrode 32, a paste layer 41G which is to be the first via electrode 41, and a paste layer 42G which is to be the second via electrode 42. Each paste layer can be formed by printing a paste containing a metal powder and a ceramic powder on the green sheet 10G. The green sheet 10G may be made up of a single layer, or made up of a plurality of green sheets stacked on each other.

The green sheet 50G as the protection layer 50 is pressure-bonded to the laminated body described above as illustrated by an arrow (FIG. 8). This pressure bonding is preferably performed together with heating.

Next, the laminated body to which the green sheet 50G has been pressure-bonded as described above is sintered. The liquid level sensor 101 is thereby obtained.

Example

Table 1 described hereinafter indicates an experimental result of examples A1 to A4 of the liquid level sensor 101 and comparative examples B1 and B2 thereof.

TABLE 1

| | | EXAMPLE A1 | EXAMPLE A2 | EXAMPLE A3 | EXAMPLE A4 | COMPARATIVE EXAMPLE B1 | COMPARATIVE EXAMPLE B2 |
|---|---|---|---|---|---|---|---|
| PROTECTION LAYER | MATERIAL | ZIRCONIA | | | ALUMINA | GLASS | ZIRCONIA |
| | RELATIVE DIELECTRIC CONSTANT $\varepsilon$ | 30 | | | 10 | 4 | 30 |
| | THICKNESS d (μm) | 5 | 1 | 10 | 3 | 5 | 20 |
| | $\varepsilon/d$ | 6.0 | 30 | 3.0 | 3.3 | 0.8 | 1.5 |
| DETECTION ELECTRODE | MATERIAL | PLATINUM | | | TUNGSTEN | PLATINUM | |
| SENSITIVITY (pF/mm) | LIQUID ELECTRICAL CONDUCTIVITY = 1 mS/cm | 15 | 120 | 7.0 | 8.0 | 3.5 | 5.0 |
| | LIQUID ELECTRICAL CONDUCTIVITY = 0.01 mS/cm | 3.0 | 24 | 1.5 | 2.0 | 0.7 | 1.0 |

The bottom of Table 1 described above indicates sensitivity when a liquid level of each of a liquid having an electrical conductivity of 1 mS/cm and a liquid having an electrical conductivity of 0.01 mS/cm was measured by each of these liquid level sensors. As shown by this result, higher sensitivity was obtained in the cases of examples A1 to A3, in which the protection layer 50 was made of zirconia and had the thickness d of 10 μm or less, than the case of comparative example B1, in which the protection layer 50 was made of glass and the case of comparative example B2, in which the protection layer 50 had the thickness d of 20 μm, larger than 10 μm. Higher sensitivity was obtained also in the case of example A4, in which the protection layer 50 was made of alumina and had the thickness d of 10 μm or less, specifically 3 μm, than the cases of comparative example B1 and comparative example B2.

In the above experiment, the first detection electrode 21 and the second detection electrode 22 were a pair of line patterns each having a width of 100 μm, and these line patterns were separated by a space having a width of 100 μm. In other words, a dimension of L=S=100 μm was adopted in FIG. 1. Each of the first detection electrode 21 and the second detection electrode 22 had an area of 13 mm² and a thickness of 3 μm.

Table 2 described hereinafter indicates an experimental result of further examples A5 to A8 having the protection layer 50 similar to that of example A1 together with the experimental result of example A1.

20 μm or more, a desired electrode interval can be formed by multilayer ceramic technology relatively easily.

When the electrode width L is 100 μm or less, higher sensitivity can be obtained. When the electrode width L is 20 μm or more, a desired electrode width can be formed by multilayer ceramic technology relatively easily.

Both the insulating layer 10 and the protection layer 50 are preferably made up of a ceramic insulating material, and is more preferably made up of the same material. Suppressed accordingly is a difference in a shrinkage ratio in a sintering process for manufacturing the liquid level sensor 101. Thus, the protection layer 50 with no pin hole can be obtained even when the thickness d thereof is relatively small. Accordingly, the thickness d can be reduced while sufficiently obtaining the effect of increasing the corrosion resistance and the chemical resistance by the protection layer 50.

TABLE 2

| | | EXAMPLE A1 | EXAMPLE A5 | EXAMPLE A6 | EXAMPLE A7 | EXAMPLE A8 |
|---|---|---|---|---|---|---|
| PROTECTION LAYER | MATERIAL | | | ZIRCONIA | | |
| | RELATIVE DIELECTRIC CONSTANT ε | | | 30 | | |
| | THICKNESS d (μm) | | | 5 | | |
| | ε/d | | | 6 | | |
| DETECTION ELECTRODE | MATERIAL | | | PLATINUM | | |
| | ELECTRODE WIDTH L (μm) | 100 | 20 | 50 | 50 | 150 |
| | ELECTRODE INTERVAL S (μm) | 100 | 20 | 30 | 50 | 150 |
| SENSITIVITY (pF/mm) | LIQUID ELECTRICAL CONDUCTIVITY = 1 mS/cm | 15 | 15 | 15 | 15 | 12 |
| | LIQUID ELECTRICAL CONDUCTIVITY = 0.01 mS/cm | 3.0 | 5.0 | 4.0 | 3.5 | 2.0 |

Examples A1 to A7 having the electrode interval S of 100 μm or less had higher sensitivity than example A8 having the electrode interval S of 150 μm. Examples A1 to A7 having the electrode width L of 100 μm or less had higher sensitivity than example A8 having the electrode width L of 150 μm.

(Outline of Effect)

According to the present embodiment, firstly, the protection layer 50 covering the first detection electrode 21 and the second detection electrode 22 is made of zirconia or alumina. Accordingly, corrosion resistance and chemical resistance of the liquid level sensor 101 are increased.

Secondly, the thickness d of the protection layer 50 satisfies 1 μm≤d≤10 μm. Accordingly, significant reduction in sensitivity of the liquid level sensor 101 caused by the provision of the protection layer 50 is prevented while ensuring the corrosion resistance and the chemical resistance described above.

As described above, detection can be performed with a high degree of sensitivity while ensuring the corrosion resistance and the chemical resistance. Specifically, the liquid level can be detected with a high degree of sensitivity.

The protection layer 50 is preferably made of zirconia. Accordingly, the relative dielectric constant ε of the protection layer 50 takes a high value of approximately 30. Accordingly, reduction in sensitivity of the liquid level sensor 101 caused by the provision of the protection layer 50 is prevented more sufficiently.

ε/d≥1 is preferably satisfied. Accordingly, a capacitance per unit area formed via the protection layer 50 is increased. Accordingly, the sensitivity of the liquid level sensor 101 can be easily ensured sufficiently.

When the electrode interval S is 100 μm or less, higher sensitivity can be obtained. When the electrode interval S is A portion which is to be the protection layer 50 is preferably formed by pressure-bonding the green sheet 50G (FIG. 8). Accordingly, the protection layer 50 with no pin hole can be obtained even when the thickness d thereof is relatively small compared with a case where the portion is formed by applying a ceramic paste.

The first detection electrode 21 and the second detection electrode 22 are preferably made of metal having a high melting point, and is made of platinum, tungsten, or cobalt, for example. Accordingly, volatilization and melting of the electrodes in a sintering process for manufacturing the liquid level sensor 101 can be prevented.

Embodiment 2

Figure 9:
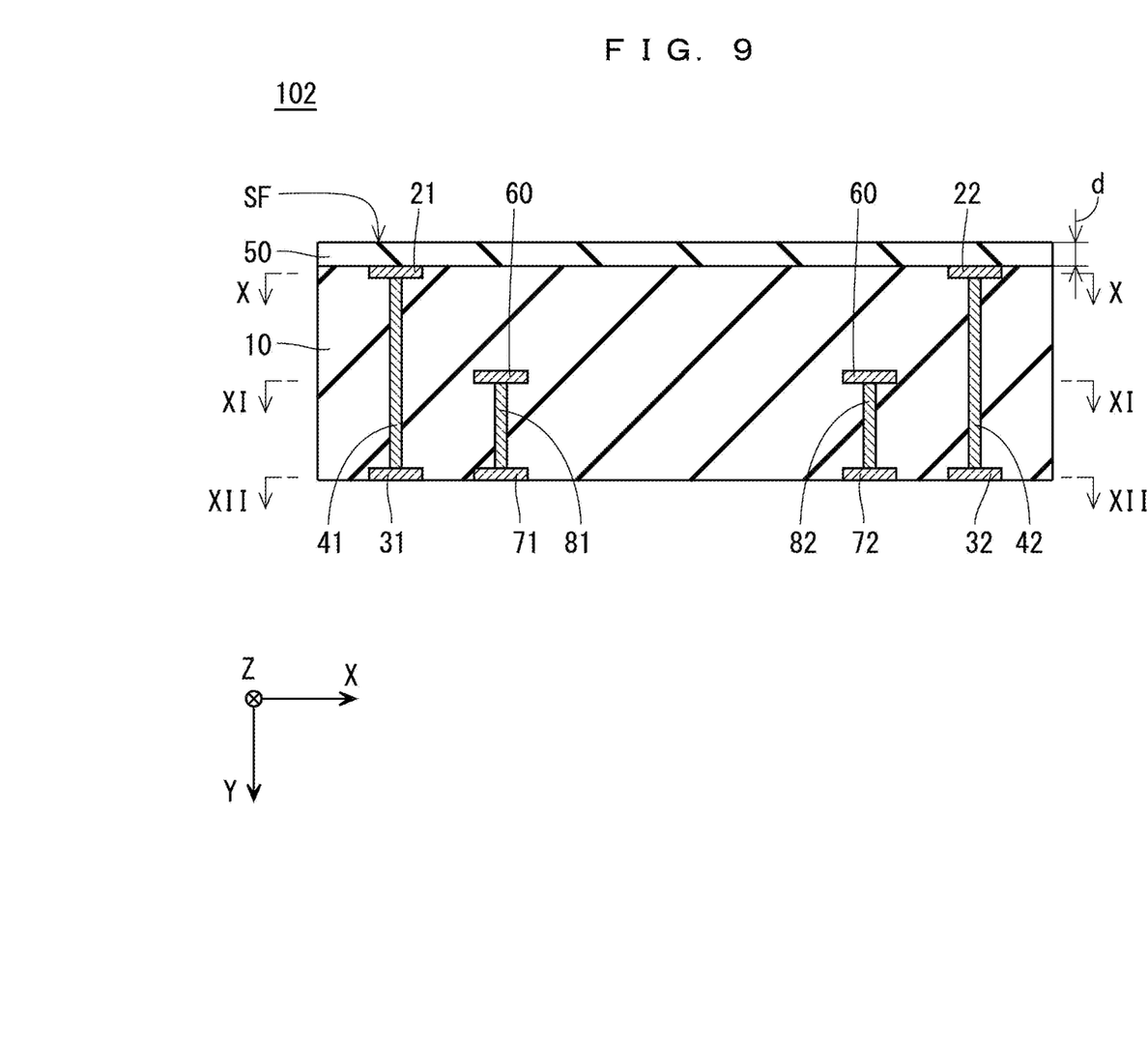
FIG. 9 is a cross-sectional view schematically illustrating a configuration of a capacitive sensor according to embodiment 2.
Figure 10:
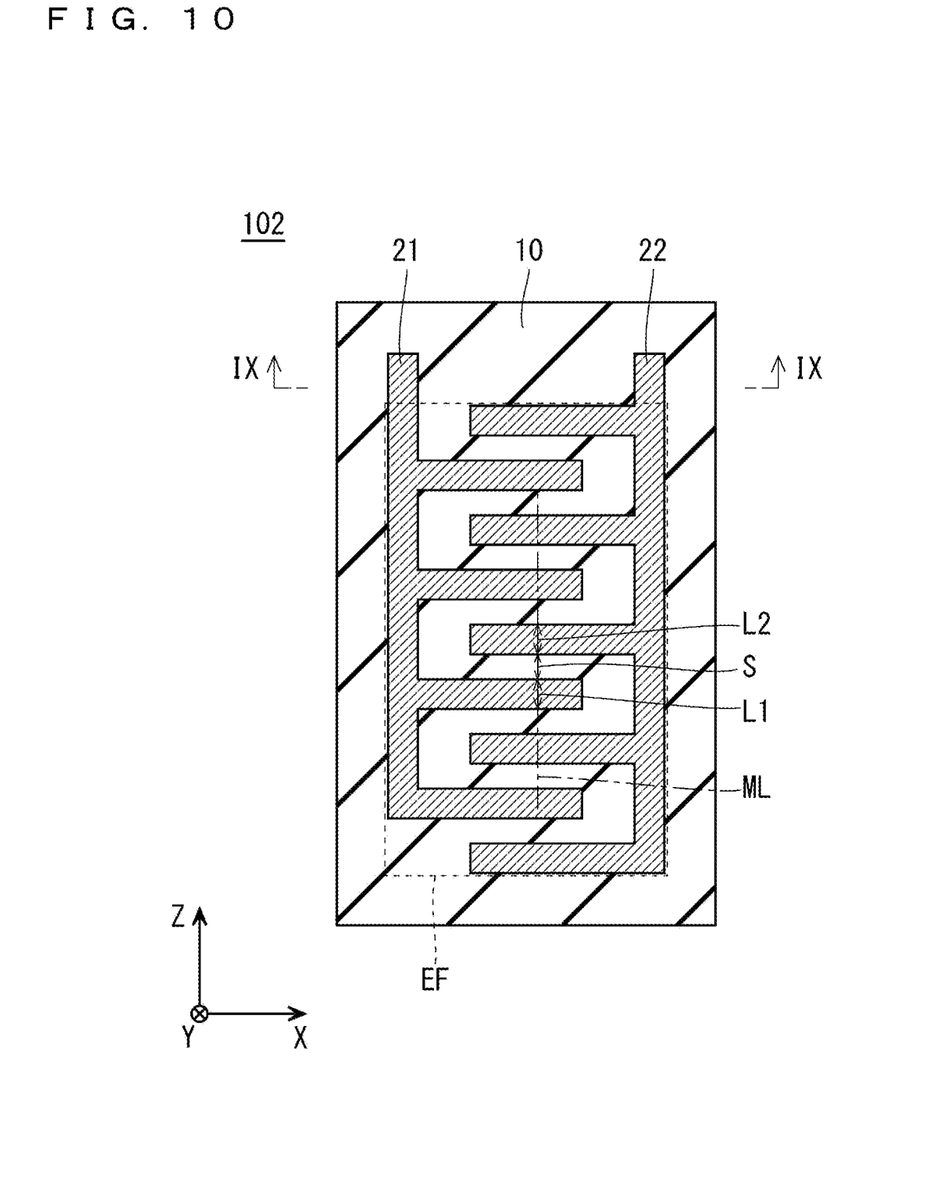
FIG. 10 is a schematic partial cross-sectional view along a line X-X in FIG. 9.
Figure 11:
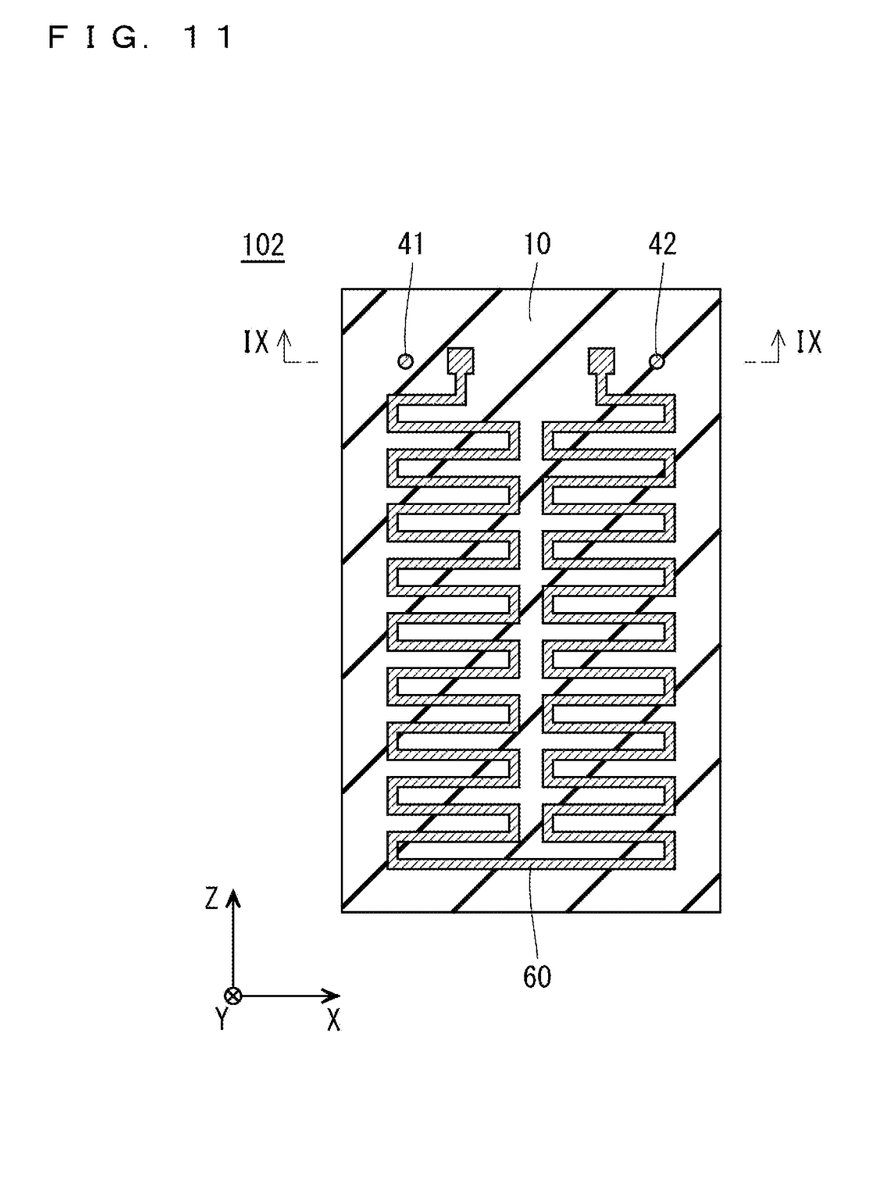
FIG. 11 is a schematic partial cross-sectional view along a line XI-XI in FIG. 9.
Figure 12:
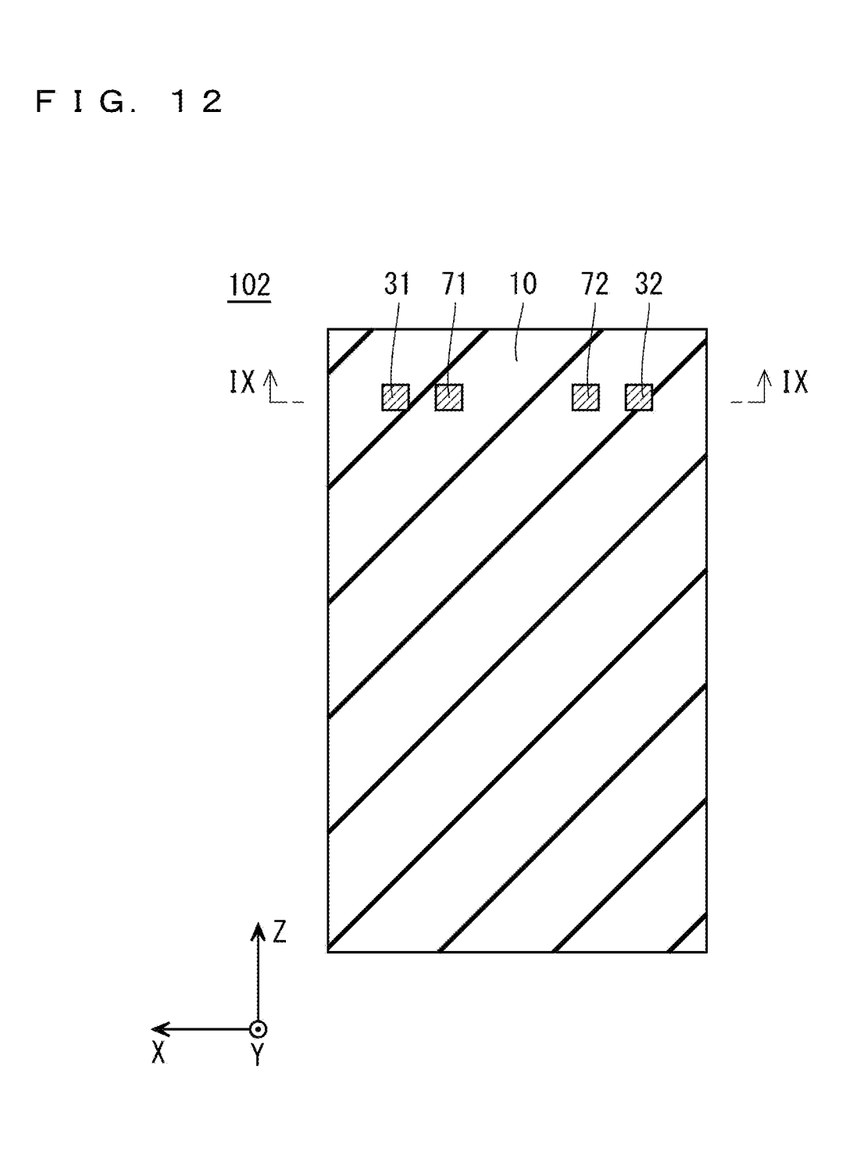
FIG. 12 is a schematic partial cross-sectional view along a line XII-XII in FIG. 9.

FIG. 9 is a cross-sectional view schematically illustrating a configuration of a dew condensation sensor 102 (a capacitive sensor as a liquid detection sensor) according to the present embodiment. FIG. 10 to FIG. 12 are schematic partial cross-sectional views along a line X-X, a line XI-XI, and a line XII-XII in FIG. 9, respectively.

In the detection system 500 (FIG. 1 and FIG. 2), the dew condensation sensor 102 is used in place of the liquid level sensor 101; thus dew condensation on the protection layer 50 can be detected. The first detection electrode 21 and the second detection electrode 22 for the dew condensation sensor 102 preferably have a comb-like shape as illustrated in FIG. 10. Accordingly, detection sensitivity of the dew condensation is increased.

A minimum interval between the first detection electrode 21 and the second detection electrode 22 is defined as an electrode interval S (FIG. 10) in the manner similar to the case in FIG. 1 (embodiment 1) with reference to FIG. 10. The electrode interval S is preferably equal to or larger than 20 µm and equal to or smaller than 100 µm. In the manner similar to the case in FIG. 1 (embodiment 1), the electrode interval S (FIG. 10) is the dimension on at least one straight line ML, and the dimension of the first detection electrode 21 and the dimension of the second detection electrode 22 on the at least one straight line ML are defined as the electrode width L1 and the electrode width L2, respectively. Each of the electrode width L1 and the electrode width L2 are preferably equal to or larger than 20 µm and equal to or smaller than 100 respectively. The electrode width L1 and the electrode width L2 are collectively referred to as an electrode width L in some cases also in the present embodiment in the manner similar to embodiment 1.

The dew condensation sensor 102 preferably includes a heater 60 for heating the protection layer 50. Heat generation is obtained by flowing current in the heater 60. The protection layer 50 is thereby heated; thus a liquid adhering to the surface SF can be removed by evaporation. Thus, when a large amount of liquid adheres to the surface SF due to cleaning or long-term use, for example, the liquid is removed using the heater 60; thus a state where further occurrence of dew condensation can be detected can be rapidly obtained.

The heater 60 is preferably embedded inside the dew condensation sensor 102, and is more preferably embedded inside the insulating layer 10. In such a case, the dew condensation sensor 102 may include a pad electrode 71, a pad electrode 72, a via electrode 81, and a via electrode 82 to enable an electrical connection to the heater 60. One end of the via electrode 81 (an upper end in FIG. 9) and one end of the via electrode 82 (an upper end in FIG. 9) are connected to one end and the other end of the heater 60, respectively. The other end of the via electrode 81 (a lower end in FIG. 9) and the other end of the via electrode 82 (a lower end in FIG. 9) are connected to the pad electrode 71 and the pad electrode 72, respectively. According to this configuration, the heater 60 can generate heat when voltage is applied between the pad electrode 71 and the pad electrode 72.

The heater 60 described above and the configuration related thereto may be applied to the other capacitive sensor such as the liquid level sensor 101 (embodiment 1), for example.

The configuration other than that described above is almost the same as the configuration of the liquid level sensor 101 (embodiment 1); thus the same sign is assigned to the same or corresponding element, and the description thereof is not repeated.

Table 3 described hereinafter indicates an experimental result of example D1 of the dew condensation sensor 102 described above and comparative example E1 thereof.

TABLE 3

| | | EXAMPLE D1 | COMPARATIVE EXAMPLE E1 |
|---|---|---|---|
| PROTECTION LAYER | MATERIAL | ZIRCONIA | |
| | RELATIVE DIELECTRIC CONSTANT ε | 30 | |
| | THICKNESS d (µm) | 5 | 20 |
| | ε/d | 6.0 | 1.5 |
| MEASUREMENT VALUE CHANGE (pF) | INITIAL STATE | 0 | 0 |
| | 2 SECONDS AFTER STARTING VAPOR BLOWING | 5 | 0 |
| | 2 SECONDS AFTER STOPPING VAPOR BLOWING | 0 | 0 |

The bottom of Table 3 described above indicates a change in the capacitance on blowing vapor to each of these dew condensation sensors from a vapor generation source located 50 mm away from the dew condensation sensors. As shown by this result, in the case of example D1, in which the thickness d of the protection layer 50 is 5 the generation of the dew condensation caused by blowing the vapor and disappearance of the dew condensation caused by stopping the blowing of the vapor could be detected as the change in the capacitance. In the meanwhile, in the case of comparative example E1, in which the thickness d of the protection layer 50 is 20 µm, the change in the capacitance caused by blowing the vapor could not be detected.

Table 4 described hereinafter indicates an experimental result of further examples D2 to D4 and comparative example E2, having the protection layer 50 similar to that of example D1, together with the experimental result of example D1.

TABLE 4

| | | EXAMPLE D1 | EXAMPLE D2 | EXAMPLE D3 | EXAMPLE D4 | COMPARATIVE EXAMPLE E2 |
|---|---|---|---|---|---|---|
| PROTECTION LAYER | MATERIAL | | | ZIRCONIA | | |
| | RELATIVE DIELECTRIC CONSTANT ε | | | 30 | | |
| | THICKNESS d (µm) | | | 5 | | |
| | ε/d | | | 6 | | |
| DETECTION ELECTRODE | ELECTRODE WIDTH L (µm) | 100 | 50 | 50 | 20 | 150 |
| | ELECTRODE INTERVAL S (µm) | 100 | 50 | 30 | 20 | 150 |
| MEASUREMENT VALUE CHANGE (pF/mm²) | 2 SECONDS AFTER STARTING BLOWING DESCRIBED ABOVE | 0.1 | 0.2 | 0.4 | 0.6 | 0 |

In Table 4 describe above, the measurement value change (pF/mm²) is a change amount of the capacitance per unit area of an effective portion EF (FIG. 10) of the dew condensation sensor 102. The effective portion EF is a portion substantially contributing to the capacitance in the dew condensation sensor 102 (FIG. 10) in a plan view (FIG. 10). Specifically, the effective portion EF is a portion other than an outer peripheral portion which does not substantially contribute to the capacitance in a plan view (FIG. 10).

The measurement value change caused by the dew condensation could be detected in examples D1 to D4, each having the electrode interval S of 100 µm or less. In the meanwhile, the measurement value change caused by the dew condensation could not be detected in comparative example E2 having the electrode interval S of 150 µm. The reason is considered that a size of a liquid drop generated by the dew condensation is smaller than 150 µm; thus in comparative example E2, the liquid drop was not located across both the first detection electrode 21 and the second detection electrode 22 in a plan view (FIG. 10). Thus, when the capacitive sensor is the dew condensation sensor as with the present embodiment, it is considered that the electrode interval S is particularly desired to be 100 µm or less.

When the electrode width L is assumed to be excessive while the electrode interval S is kept in each of examples D1 to D4, the measurement value change is considered to be small.

According to the present embodiment, the dew condensation can be detected with a high degree of sensitivity while ensuring corrosion resistance and chemical resistance. The configuration of the protection layer 50 in the embodiment shown by Table 3 described above is an example; thus the configuration of the protection layer 50 described in embodiment 1 may be adopted in place thereof. A favorable configuration of the protection layer 50 in the case of the present embodiment is also almost similar to that in the case of embodiment 1.

When the electrode interval S is 100 µm or less, the dew condensation can be detected more reliably. When the electrode interval S is 20 µm or more, a desired electrode interval can be formed by multilayer ceramic technology relatively easily.

When the electrode width L is 100 µm or less, reduction in the measurement value change caused by the excessive electrode width L is prevented. When the electrode width L is 20 µm or more, a desired electrode width can be formed by multilayer ceramic technology relatively easily.

As described above, when a minute dimension of 100 µm or less is used in relation to the first detection electrode 21 and the second detection electrode 22, it tends to be particularly difficult to prevent the protection layer 50 from significantly inhibiting the detection of the dew condensation while ensuring corrosion resistance and chemical resistance by the protection layer 50. However, according to the present embodiment, such a configuration can be achieved.

When the heater 60 is provided, the liquid adhering to the surface SF of the protection layer 50 can be removed by heating. Accordingly, sensitivity for newly detecting the liquid can be rapidly ensured.

Describe above in detail is the use application for detecting the liquid level and the dew condensation as the use application of the capacitive sensor; however, the capacitive sensor may be adopted to the other use application. The embodiments described above and a modification example may be freely combined with each other. Although the present invention is described in detail, the foregoing description is in all aspects illustrative and does not restrict the invention. It is therefore understood that numerous modifications and variations can be devised without departing from the scope of the invention.

What is claimed is:

1. A liquid detection sensor using a change of a capacitance, comprising:
    an insulating layer;
    a first detection electrode provided on the insulating layer;
    a second detection electrode provided away from the first detection electrode on the insulating layer, and forms the capacitance together with the first detection electrode; and
    a protection layer covering the first detection electrode and the second detection electrode, having a thickness d satisfying 1 µm≤d≤10 µm, and is made of zirconia or alumina, the protection layer being a sintered body and having a surface facing the first detection electrode and the second detection electrode and an exposed surface opposite to the surface,
    wherein the insulating layer on which the first and second detection electrodes are provided and the protection layer form a laminated body without having a space, and
    wherein the protection layer has a relative dielectric constant ε, and ε/d≥1 is satisfied.

2. The liquid detection sensor according to claim 1, wherein
    the protection layer is made of zirconia.

3. The liquid detection sensor according to claim 1, wherein
    a minimum interval between the first detection electrode and the second detection electrode is 100 µm or less.

4. The liquid detection sensor according to claim 3, wherein
    the minimum interval is a dimension on at least one straight line, and a dimension of each of the first detection electrode and the second detection electrode is 100 µm or less on the at least one straight line.

5. The liquid detection sensor according to claim 1, further comprising
    a heater for heating the protection layer.

6. The liquid detection sensor according to claim 1, wherein
    the liquid detection sensor is a liquid level sensor.

7. The liquid detection sensor according to claim 1, wherein
    the liquid detection sensor is a dew condensation sensor.

8. The liquid detection sensor according to claim 1, wherein
    the relative dielectric constant ε of the protection layer is 10 or more.

\* \* \* \* \*